US012786235B2

(12) United States Patent
Mittelman Elberg et al.

(10) Patent No.: US 12,786,235 B2
(45) Date of Patent: Nov. 3, 2026

(54) HONEYPOT-BASED ATTACK DETECTION

(71) Applicant: HEWLETT PACKARD ENTERPRISE DEVELOPMENT LP, Spring, TX (US)

(72) Inventors: Dana Mittelman Elberg, Herzliya (IL); Maya Leshem, Herzliya (IL); Miri Kogan, Herzliya (IL)

(73) Assignee: Hewlett Packard Enterprise Development LP, Spring, TX (US)

( * ) Notice: Subject to any disclaimer, the term of this patent is extended or adjusted under 35 U.S.C. 154(b) by 264 days.

(21) Appl. No.: 18/638,800

(22) Filed: Apr. 18, 2024

(65) Prior Publication Data

US 2025/0330493 A1 Oct. 23, 2025

(51) Int. Cl.

*G06F 15/16* (2006.01)
*G06F 9/54* (2006.01)
*H04L 9/40* (2022.01)
*H04L 29/06* (2006.01)

(52) U.S. Cl.

CPC ...... *H04L 63/1491* (2013.01); *H04L 63/1416* (2013.01)

(58) Field of Classification Search

CPC ............. H04L 63/1491; H04L 63/1416; G06F 21/566; G06F 2221/033
USPC ............................................................ 726/23
See application file for complete search history.

(56) References Cited

U.S. PATENT DOCUMENTS 7,904,959 B2 * 3/2011 Sidiroglou ............ G06F 21/554 726/22
10,609,066 B1 * 3/2020 Nossik ................ H04L 63/1408
10,956,575 B2 3/2021 Harsany et al.
11,349,855 B1 * 5/2022 Amit ........................ G06F 9/547
11,645,383 B2 * 5/2023 Guri ........................ G06F 21/54 726/22
11,662,928 B1 * 5/2023 Kumar ................ G06F 11/1448 713/150
11,693,963 B2 7/2023 Mueller-Wicke et al.
11,755,733 B1 * 9/2023 Armangau ............ G06F 21/561 726/23
12,058,175 B2 * 8/2024 Lai ...................... H04L 63/1491

(Continued)

FOREIGN PATENT DOCUMENTS

CN 112383520 A * 2/2021 ......... H04L 63/1425
CN 110995640 B * 4/2022 ............. H04L 67/60

(Continued)

OTHER PUBLICATIONS

Anthony Today, Impact of Ransomware Attacks on Businesses and Individuals, Exploring the Devastating Effects and Importance of Implementing Preventative Measures, Feb. 1, 2023 (13 pages).

(Continued)

*Primary Examiner* — Hamza N Algibhah

(74) *Attorney, Agent, or Firm* — Trop, Pruner & Hu, P.C.

(57) ABSTRACT

In some examples, a system monitors input/output (I/O) operations to identify data matching a honeypot pattern. The system determines storage location information associated with the data identified as matching the honeypot pattern, and detects an access of the data at a storage location indicated by the storage location information. The system indicates a potential attack based on detecting the access of the data at the storage location indicated by the storage location information.

16 Claims, 4 Drawing Sheets

(56) References Cited

U.S. PATENT DOCUMENTS

| | | | | |
|---|---|---|---|---|
| 12,306,947 | B2 * | 5/2025 | Smith | G06F 21/54 |
| 2006/0075494 | A1 | 4/2006 | Bertman et al. | |
| 2009/0228533 | A1 | 9/2009 | Reddy et al. | |
| 2014/0181032 | A1 | 6/2014 | Kumarasamy et al. | |
| 2014/0359708 | A1 * | 12/2014 | Schwartz | G06F 21/567 726/4 |
| 2016/0077977 | A1 * | 3/2016 | Narayanamurthy | H04L 63/123 713/193 |
| 2018/0157834 | A1 * | 6/2018 | Continella | G06F 21/568 |
| 2019/0065745 | A1 | 2/2019 | Araujo et al. | |
| 2019/0108340 | A1 * | 4/2019 | Bedhapudi | G06F 21/554 |
| 2019/0332766 | A1 * | 10/2019 | Guri | G06F 21/565 |
| 2020/0204589 | A1 * | 6/2020 | Strogov | H04L 63/1416 |
| 2021/0011985 | A1 | 1/2021 | Korotaev | |
| 2021/0026947 | A1 | 1/2021 | Korotaev | |
| 2021/0103555 | A1 | 4/2021 | Kaplingat et al. | |
| 2021/0160283 | A1 * | 5/2021 | St. Pierre | H04L 63/1491 |
| 2021/0334374 | A1 * | 10/2021 | Vasudeva | G06F 21/602 |
| 2021/0397711 | A1 * | 12/2021 | Karr | G06F 11/108 |
| 2022/0215096 | A1 * | 7/2022 | Spurlock | G06F 11/14 |
| 2023/0205640 | A1 | 6/2023 | Yadav et al. | |
| 2023/0231882 | A1 * | 7/2023 | Deng | H04L 63/1416 726/23 |
| 2023/0362194 | A1 * | 11/2023 | Lai | H04L 63/1491 |
| 2023/0367876 | A1 * | 11/2023 | Algieri | G06F 21/566 |
| 2024/0244077 | A1 * | 7/2024 | Benisty | H04L 63/145 |
| 2024/0248803 | A1 * | 7/2024 | Rothschild | G06F 11/1451 |
| 2025/0106251 | A1 * | 3/2025 | Strogov | H04L 63/1491 |
| 2025/0173423 | A1 * | 5/2025 | Strogov | G06F 21/53 |
| 2025/0284803 | A1 * | 9/2025 | Pletka | G06F 21/565 |
| 2025/0310376 | A1 * | 10/2025 | Strogov | H04L 63/1416 |
| 2025/0330493 | A1 * | 10/2025 | Mittelman Elberg | H04L 63/1491 |

FOREIGN PATENT DOCUMENTS

| | | | | | |
|---|---|---|---|---|---|
| CN | 116208395 | A | * | 6/2023 | |
| CN | 117424751 | A | * | 1/2024 | H04L 63/1491 |
| CN | 119766469 | A | * | 4/2025 | |
| CN | 120832669 | A | * | 10/2025 | G06F 21/566 |
| DE | 102024136841 | A1 | * | 10/2025 | G06F 21/566 |
| WO | 2022/002405 | A1 | | 1/2022 | |

OTHER PUBLICATIONS

Brad Rudisail, The Limitations of Honeypots for Ransomware, Jun. 12, 2022 (7 pages).

HPE Enterprise, HPE Greenlake, Edge-to-cloud platform downloaded Apr. 16, 2024 (14 pages).

Kyle Johnson, 3 ransomware detection techniques to catch an attack, Aug. 7, 2023 (5 pages).

Moore, Chris, Detecting Ransomware with Honeypot techniques downloaded Mar. 3, 2024 (5 pages).

Rubrik, Detect ransomware impact quickly downloaded Apr. 16, 2024 (6 pages).

Semion Mazor, NetApp Ransomware Protection?, Ransomware Detection: Techniques and Best Practices, Jun. 11, 2022 (5 pages).

Smart PC Utilities, Ransomware: How to Detect and Stop them with Honeypots? Dec 18, 2021 (8 pages).

Unitrends, Ransomware Detection and Recovery downloaded Apr. 16, 2024 (7 pages).

Veeam One, It's Time to Get Proactive About Threat Mitigation downloaded Apr. 16, 2024 (17 pages).

Wikipedia, Entropy downloaded Apr. 16, 2024 (17 pages).

www.checkpoint.com—Ransomware Detection Techniques downloaded Apr. 16, 2024 (6 pages).

Zscaler, Zscaler ThreatLabz 2023 Ransomware Report, 2023 (62 pages).

LSoft Technologies Inc., "NTFS Master File Table (MFT)", available online at <https://web.archive.org/web/20230606063324/https://ntfs.com/ntfs-mft.htm>, Jun. 6, 2023, 3 pages.

"Ransomware Detection Techniques", Apr. 16, 2024, 6 pages.

Wikipedia, "Entropy", available online at <https://en.wikipedia.org/w/index.php?title=Entropy&oldid=1217531012>, downloaded Apr. 16, 2024 (17 pages).

* cited by examiner

HONEYPOT-BASED ATTACK DETECTION

BACKGROUND

A ransomware attack involves encrypting data on a computer or on multiple computers connected over a network. In a ransomware attack, data can be encrypted using an encryption key, which renders the data inaccessible to users unless a ransom is paid to obtain the encryption key. A ransomware attack can be highly disruptive to enterprises, including businesses, government agencies, educational organizations, individuals, and so forth.

BRIEF DESCRIPTION OF THE DRAWINGS

Some implementations of the present disclosure are described with respect to the following figures.

Figure 1:
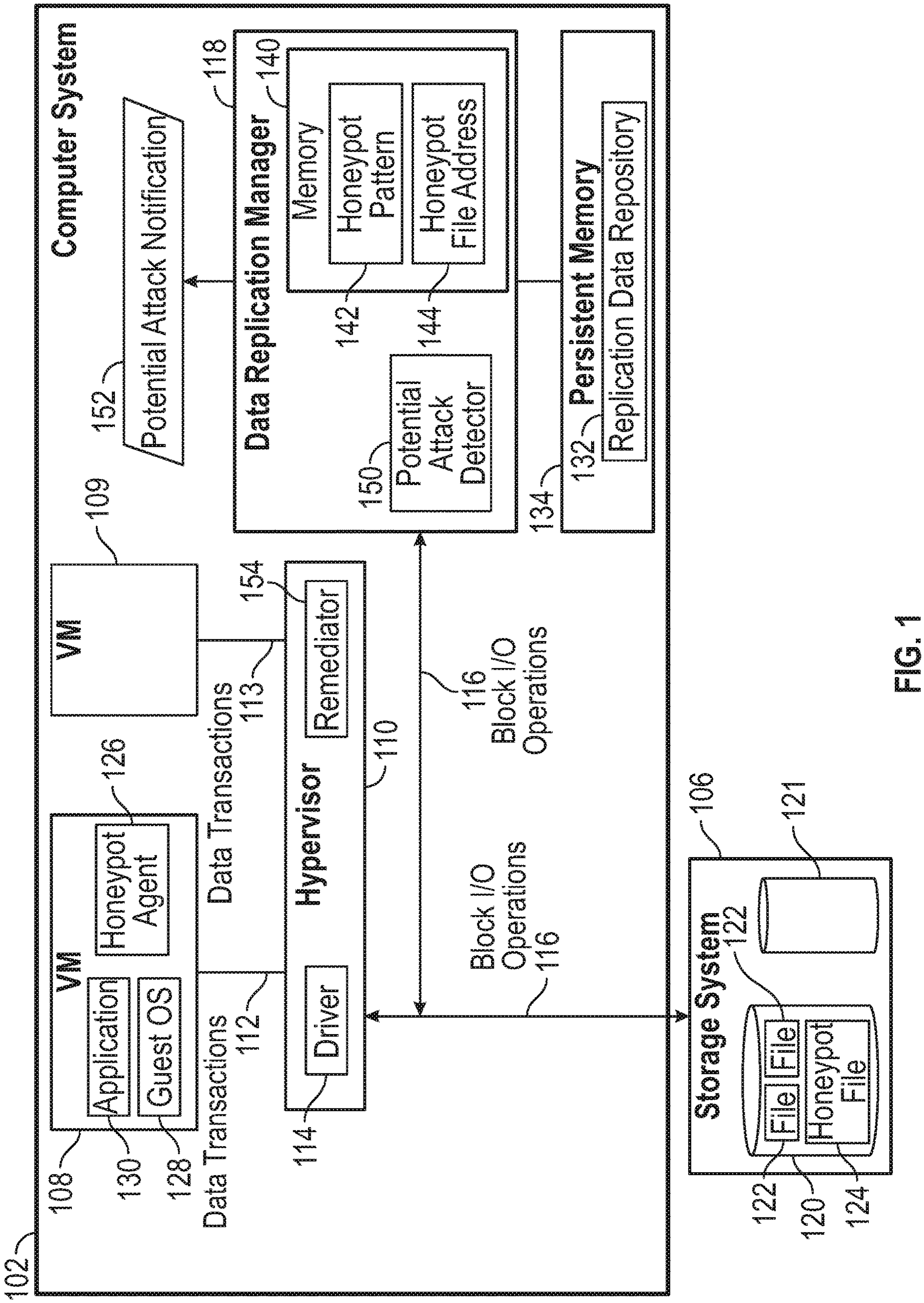
FIG. 1 is a block diagram of a computer system including a honeypot agent and a data replication manager according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Quick detection of ransomware attacks can reduce the likelihood of an attacker stealing sensitive information and rendering the information inaccessible due to encryption of the information. Any delay in detection can reduce the likelihood of the victim being able to recover from a ransomware attack and avoiding data theft.

Some ransomware protection systems may be able to detect a ransomware attack based on detecting that unauthorized encryption of data is occurring. For example, scanning of input/output (I/O) operations can be performed to detect if data is being encrypted. However, by the time a ransomware attack is detected based on the detection of data encryption, a substantial amount of data may already have been encrypted, and further, an attacker may already have retrieved (exfiltrated) the data for possible public exposure. Note that data exfiltration by the attacker may occur before the attacker encrypts the data. Also, some ransomware protection systems may be prone to raising false positives in which ransomware attacks are indicated when legitimate data encryption operations are being performed.

In accordance with some implementations of the present disclosure, a data protection system uses deception-based detection techniques or mechanisms that employ honeypot data to detect a potential attack (e.g., a potential encryption attack or any other attack) against data of a computer system. An "attack" against data can refer to any unauthorized access (write or read) of the data. In some examples, the data protection system can include a honeypot agent and a data replication manager. The honeypot agent creates a honeypot file that contains data according to a honeypot pattern. A "honeypot pattern" refers to a predefined pattern of data that is to be contained in a honeypot file. The presence of the honeypot pattern in a given file indicates that the file is a honeypot file rather than a "regular" file. Generally, a "honeypot file" refers to a file that serves as a trap for attracting unauthorized entities (users, programs, machines, or other entities) to access the file. The honeypot file is a fake file in that authorized entities associated with the computer system would not normally access the honeypot file, since the honeypot file does not contain any valid data that is meaningful to the authorized entities. In contrast, a "regular" file is a file that is accessed during an operation of the computer system associated with an authorized entity, which is an entity (a user, a program, a machine, or another entity) that has permissions to use or access the computer system. A "file" can refer to any identifiable container of data, which can be in the form of a file of a filesystem, an object, or any other type of data container.

The data replication manager replicates data writes (which write data to a data volume) to a replication storage system. The data replication manager can monitor I/O operations to identify data matching the honeypot pattern, and determine storage location information associated with the data identified as matching the honeypot pattern. The storage location information identifies the storage location of a honeypot file, for example. The data replication manager detects an access of the data at the storage location indicated by the storage location information, and the data replication manager indicates a potential attack based on detecting the access of the data at the storage location indicated by the storage location information.

FIG. 1 is a block diagram of an example arrangement that includes a computer system 102 and a storage system 106. Examples of computer systems can include any or some combination of the following: computers (e.g., server computers, desktop computers, notebook computers, tablet computers, or other types of computers), smartphones, Internet of Things (IoT) devices, household appliances, vehicles, game appliances, or other types of electronic devices.

The computer system 102 can store data in the storage system 106 coupled to the computer system 102. The storage system 106 can be part of the computer system 102, or the storage system 106 can be outside the computer system 102. The storage system 106 can be implemented using a collection of storage devices (one storage device or multiple storage devices). Examples of storage devices can include any or some combination of the following: disk-based storage devices, solid state drives, or other types of storage devices.

In some examples, the computer system 102 executes one or more programs (including machine-readable instructions) that can perform data transactions that read and write data in the storage system 106. Examples of programs can include virtual computing entities, such as virtual machines (VMs) 108, 109. Although two VMs are depicted in FIG. 1, in other examples, a different quantity (1 or more than 1) of VMs can execute in the computer system 102.

A VM is a virtual computing entity that emulates a physical computer. A guest operating system (OS) and one or more application programs can execute in a VM. For example, the VM 108 includes a guest OS 128 and one or more application programs 130. The VM 109 similarly includes a guest OS and one or more application programs (not shown).

In other examples, other virtual computing entities executable in the computer system 102 can include containers, which are isolated computing environments in which application programs can execute. In further examples, virtualized computing environments are not implemented in the computer system 102; in such examples, programs can execute in environments provided by a host OS (not shown) of the computer system 102.

In examples where VMs are executed in the computer system 102, a hypervisor 110 (implemented as machine-readable instructions) is also present in the computer system 102. A hypervisor is also referred to as a virtual machine monitor (VMM). The hypervisor 110 creates and controls execution of the VMs 108, 109. The hypervisor 110 is also responsible for presenting emulated instances of physical resources (e.g., processing resources, storage resources, communication resources, or other resources) of the computer system 102 to each of the VMs 108, 109.

More generally, the hypervisor 110 is an example of a virtualization management program that runs on the computer system 102. Another example of a virtualization management program is a container engine that can start and manage containers in the computer system 102.

The ensuing discussion refers to some examples that employ VMs. Note that techniques or mechanisms according to some examples of the present disclosure may be applied with other types of virtual computing entities, such as containers, or in computer systems that do not implement virtualized computing environments.

In the example of FIG. 1, the VM 108 (or more specifically, a program such as the application program 130 or the guest OS 128 executed in the VM 108) can read or write data in data volumes 120, 121. Although 2 data volumes are depicted in FIG. 1, a different example can involve a different quantity (1 or more than 1) of data volumes. A "data volume" refers to a logical container of data that is accessible by a VM. Data of the data volumes 120, 121 is physically stored at the storage system 106. When a program (the application program 130 or the guest OS 128) accesses (reads or writes) data of a data volume 120 or 121, the VM 108 produces data transactions 112 to read or write data in the storage system 106. The data transactions 112 are received by the hypervisor 110.

Accesses of data volumes in the VM 109 similarly produce data transactions 113 that are received by the hypervisor 110.

In some examples, the hypervisor 110 includes a driver 114 that can split a data transaction 112 or 113 into block I/O operations 116 that are provided to the storage system 106. A "driver" can refer to a program that manages access to the storage system 106. In other examples, the driver may be part of a container engine or a host OS of the computer system 102.

A block I/O operation refers to a data operation on a data block, where the data block has a specified size (e.g., 512 bytes (B), 4 kB, or any other size). Each block I/O operation can read a data block from or write a data block to the storage system 106. In response to the data transactions 112, 113 from the VMs 108, 109, the driver 114 produces the block I/O operations 116 to read and/or write data blocks of the storage system 106. In other examples, the driver 114 can be omitted, and block I/O operations are produced by the hypervisor 110.

The computer system 102 includes a data replication manager 118 to protect data volumes of the VMs 108, 109. The data replication manager 118 can be implemented as machine-readable instructions executed in the computer system 102. For example, the data replication manager 118 may be executed in a VM or a container, or the data replication manager 118 may be executed as an application program or a utility program. Alternatively, the data replication manager 118 can be implemented using hardware processing circuitry of the computer system 102. In other examples, the data replication manager 118 may be outside the computer system 102.

The data replication manager 118 protects a data volume by replicating data writes to a replication data repository 132 stored in a persistent memory 134. A "replication" of a data write can refer to providing a representation of a write I/O operation (or more specifically, a write block I/O operation) that writes data to a storage system (or more specifically to a data block in the storage system), such as the storage system 106. The block I/O operations 116 can include read block I/O operations (that read data blocks in the storage system 106), and write block I/O operations (that write data blocks in the storage system 106).

The representation of the write I/O operation added to the replication data repository 132 by the data replication manager 118 can include changed data (new data or modified data or deleted data) that is written to the storage system 106.

The replication data repository 132 to which the representation of a write I/O operation is added to replicate a data write can refer to any type of data structure. In some examples, the replication data repository 132 may be stored in a persistent memory 134 in the computer system 102. A persistent memory refers to a memory that is able to maintain data stored in the memory even if power were removed from the memory. In some examples, the persistent memory 134 is implemented with a collection of persistent memory devices, such as flash memory devices, electrically erasable and programmable read-only memory (EEPROM) devices, or other forms of nonvolatile memory devices. In other examples, the replication data repository 132 may be stored in a persistent memory that is outside the computer system 102, such as in a remote backup storage system.

The replication data repository 132 includes a log of write I/O operations associated with a protected data volume. In some examples, the replication data repository 132 does not store information of read I/O operations. The representations of write I/O operations in the replication data repository 132 can be used to recover write data in case the computer system 102 experiences a fault or data in the storage system 106 becomes corrupted.

For each VM, an administrator or another entity can designate which data volume(s) of the VMs 108, 109 is (are) selected for protection by the data replication manager 118. A selected data volume is also referred to as a protected data volume. The data replication manager 118 protects the selected data volume(s), and does not protect the unselected data volume(s). The data replication manager 118 does not replicate write I/O operations associated with unselected data volume(s), also referred to as unprotected data volume (s).

In the example of FIG. 1, it is assumed that the data volume 120 for the VM 108 is a protected data volume, while the data volume 121 is an unprotected data volume. The data replication manager 118 replicates data writes for the protected data volume 120, but does not replicate data writes for the unprotected data volume 121.

The protected data volume 120 contains various files 122, which are regular files. The data volume 120 also includes a honeypot file 124, which may have been created by a honeypot agent 126 in the VM 108. The honeypot agent 126 is a program including machine-readable instructions executed in the VM 108. The honeypot agent 126 is able to create one or more honeypot files in respective one or more data volumes. Each honeypot file created by the honeypot agent 126 can have a respective honeypot pattern. In some examples, the honeypot pattern is a random pattern that is generated as a random collection of data values, including data bits, alphanumeric characters, and so forth. For example, the honeypot agent 126 can use a pseudo-random number generator to generate random numbers, and to use the random numbers to derive the random honeypot pattern. In other examples, the honeypot pattern can be a predefined data pattern produced by a user or another entity to represent a honeypot file. The honeypot agent 126 can receive the predefined data pattern from the user or other entity.

Different honeypot files created by the honeypot agent 126 can have the same honeypot pattern or may have different honeypot patterns. For example, a first honeypot file in a first data volume may have a first honeypot pattern, while a second honeypot file in a second data volume can have a different honeypot pattern.

After the honeypot file 124 is created by the honeypot agent 126 in the data volume 120, programs in the VM 108 would not normally access the honeypot file 124. However, if a program were compromised or if an unauthorized program were to be added to the VM 108, then the compromised program or unauthorized program may access the honeypot file 124. An access of the honeypot file 124 provides an indication that unauthorized activities, including an attack of data (e.g., a ransomware attack) may be occurring in the VM 108.

Other VMs (or other virtual computing entities) in the computer system 102 can similarly include honeypot agents. Alternatively or additionally, honeypot agents can execute in a non-virtualized computing environment in the computer system 102.

Figure 2:
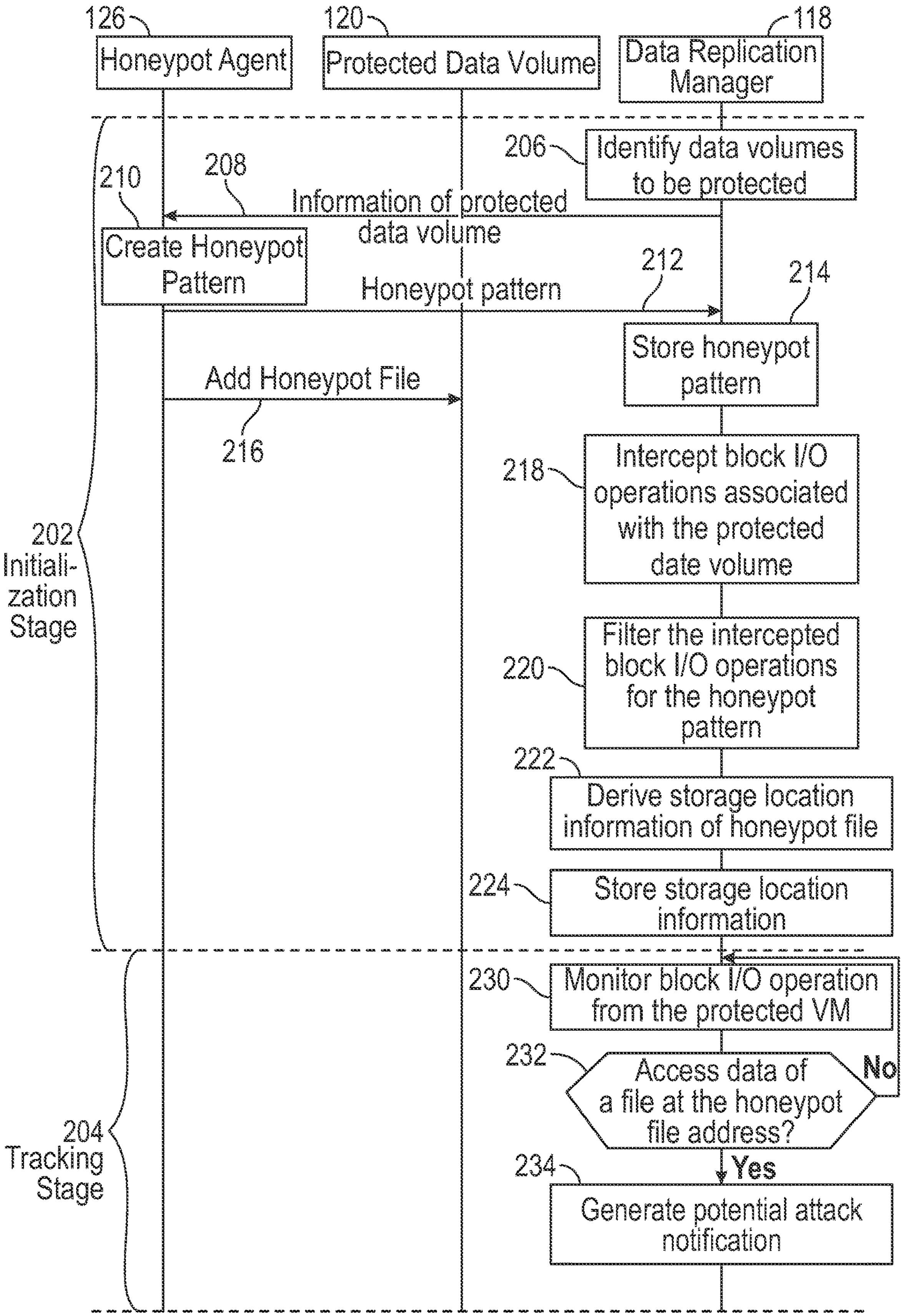
FIG. 2 is a flow diagram of a data protection process according to some examples.

The following discussion refers to both FIG. 1 and FIG. 2. FIG. 2 is a flow diagram of a data protection process that uses deception-based detection techniques according to some examples of the present disclosure. The data protection process is performed by a data protection system that includes the honeypot agent 126 and the data replication manager 118. Although FIG. 2 shows a specific order of tasks, in other examples, the tasks can be performed in a different order, some tasks may be omitted, or other tasks may be added.

The data protection process of FIG. 2 includes an initialization stage 202 and a tracking stage 204. Generally, the initialization stage 202 identifies a data volume that is to be protected (e.g., the protected data volume 120), notify the data replication manager 118 of the honeypot pattern, and add a honeypot file (e.g., 124 in FIG. 1) to the protected data volume 120. The tracking stage 204 monitors block I/O operations (e.g., 116 in FIG. 1) to detect accesses of the honeypot file 124, which may indicate that a potential attack is occurring.

The process of FIG. 2 involves the honeypot agent 126, the protected data volume 120, and the data replication manager 118. The honeypot agent 126 and the protected data volume 120 are part of the VM 108, which is referred to as a "protected VM" 108.

The initialization stage 202 includes tasks 206-224, and the tracking stage 204 includes tasks 230-234. In the initialization stage 202, the data replication manager 118 identifies (at 206) one or more data volumes of the protected VM 108 that are to be protected, which include the protected data volume 120. For example, an administrator or another entity may designate, to the data replication manager 118, which data volume(s) is (are) to be protected. For each identified protected data volume, the data replication manager 118 intercepts block I/O operations that access data of the protected data volume.

The data replication manager 118 can provide (at 208) information of a protected data volume (e.g., 120) to the honeypot agent 126. The provided information allows the honeypot agent 126 to determine which data volumes of the protected VM 108 are protected and which are unprotected. Communications between the data replication manager 118 and the honeypot agent 126 (which is executed in the protected VM 108) can pass through the hypervisor 110.

The honeypot agent 126 creates (at 208) a honeypot pattern, such as by generating a random honeypot pattern or generating another specified data pattern to be contained in a honeypot file. In other examples, the honeypot agent 126 can receive the honeypot pattern from another entity, such as a user, a program, or a machine.

The honeypot agent 126 sends (at 212) the honeypot pattern to the data replication manager 118. In examples according to FIG. 1, the data replication manager 118 includes a potential attack detector 150, which is responsible for detecting potential attacks based on detecting accesses of honeypot files. The potential attack detector 150 can be implemented with a portion of the machine-readable instructions of the data replication manager 118, or with a portion of the hardware processing circuitry of the data replication manager 118.

The potential attack detector 150 can store (at 214) the honeypot pattern 142 from the honeypot agent 126 in a memory 140 (FIG. 1) associated with the data replication manager 118. The stored honeypot pattern 142 is used by the potential attack detector 150 to detect a location of a honeypot file.

The honeypot agent 126 adds (at 216) a honeypot file containing the honeypot pattern to the protected data volume 120. Note that it is possible that the honeypot agent 126 may create multiple honeypot patterns for different honeypot files, in which case the honeypot agent 126 would provide multiple honeypot patterns to the data replication manager 118. Also, in further examples, there may be multiple honeypot agents in multiple VMs that can send honeypot patterns to the data replication manager 118.

In the initialization stage 202, the data replication manager 118 intercepts (at 218) block I/O operations associated with accesses of data to the protected data volume 120 of the protected VM 108. The potential attack detector 150 filters (at 220) the intercepted block I/O operations to determine whether the honeypot pattern 142 is present in the intercepted block I/O operations.

Depending on the size of data blocks, the honeypot pattern 142 may be contained within one data block or a collection of multiple data blocks. For example, if the size of a data block is smaller than the total size of the honeypot pattern 142, then the potential attack detector 150 checks for presence of the honeypot pattern 142 in multiple data blocks. On the other hand, if the size of a data block is the same as or larger than the total size of the honeypot pattern 142, then the potential attack detector 150 checks for presence of the honeypot pattern 142 in a single data block.

Based on detecting the honeypot pattern 142 in one or more block I/O operations, the data replication manager 118 derives (at 222) storage location information specifying where the honeypot file is located. In some examples, the storage location information includes a storage address, which can be a logical address or a physical storage address.

More specifically, the storage location information can include a range of storage addresses of the honeypot file.

The data replication manager 118 stores (at 224) the storage location information in the memory 140. In the example of FIG. 1, the storage location information is in the form of a honeypot file address 144 that specifies the storage address (or range of addresses) of the honeypot file.

At this point, the initialization stage 202 has been completed, and the data replication manager 118 can proceed to the tracking stage 204. Note that the initialization stage 202 can be re-iterated at a later time, such as on a periodic basis or when data volumes to be protected are modified.

In the tracking stage 204, the potential attack detector 150 monitors (at 230) a block I/O operation from the protected VM 108. The block I/O operation can include read block I/O operation or write block I/O operation. The data replication manager 118 determines (at 232) whether the block I/O operation accesses data of a file at an address that intersects the honeypot file address 144 (e.g., falls within the range of addresses of the honeypot file). A data access of an address that intersects the honeypot file address 144 indicates that an access of the honeypot file is occurring.

If the block I/O operation does not access data of the honeypot file at the honeypot file address 144, the data replication manager 118 returns to monitor (at 230) the next block I/O operation from the protected VM 108. On the other hand, if the block I/O operation accesses data of the honeypot file at the honeypot file address 144, the potential attack detector 150 generates (at 234) a potential attack notification 152 that indicates that a potential attack against data may be occurring. The potential attack notification 152 can be in the form of a message, an information element, or any other indicator. If the block I/O operation that accesses data at the honeypot file address 144 is a write block I/O operation, then the potential attack notification 152 may also include the write data associated with the write block I/O operation.

In some examples, the potential attack notification 152 may also include information of a latest recovery point of the protected data volume 120. A "recovery point" may refer to a point in time to which data of the protected data volume 120 can be recovered. Data writes logged to the replication data repository 132 are recoverable in case of system fault. The logged data writes have timestamp information, which can provide an indication of the recovery point of data of the protected data volume 120. Any data writes not yet added to the replication data repository 132 would not be recoverable. The "latest" recovery point of the protected data volume 120 refers to the most recent modified data (modified by data writes) that can be recovered from the replication data repository 132.

A remediator 154 (which may be part of the hypervisor 110 or separate from the hypervisor 110) may perform one or more remediation actions in response to the potential attack notification 152. The remediator 154 may send an alert to a remote entity, such as an administrator, a program, or a machine, to notify that a potential attack (e.g., a ransomware attack) may be occurring. This would allow the remote entity to take action to confirm whether an attack is occurring, and if so, to take further remediation actions.

Alternatively or additionally, the remediator 154 may respond to the potential attack notification 152 by triggering protective actions in the computer system 102, such as by shutting down the protected VM 108, disabling further access to the protected volume 120, disabling network access of the computer system 102, stopping replication of data, saving a latest recovery point, or any other remediation action.

Although FIG. 1 and FIG. 2 show examples that involve the data replication manager 118 which protects a data volume by replicating data writes to the replication data repository 132, in other examples, data replication does not have to be employed. In such other examples, a different program (referred more generally as a "data manager") instead of the data replication manager 118 can be used to perform the tasks 206, 214, 218, 220, 222, 224, 230, 232, and 234 in FIG. 2.

In some cases, computer system operations (at the computer system 102) may cause a storage address of the honeypot file 124 to change. For example, a filesystem in the computer system 102 may perform a file defragmentation operation, which defragments different segments of the file into more contiguous sections of the storage system 106 for more efficient storage and access. The file defragmentation operation can cause a storage address of the honeypot file 124 to change. Other operations may cause data of the honeypot file 124 to move, which can cause the storage address of the honeypot file 124 to change.

If the driver 114 detects a change in the storage address of the honeypot file 124, the driver 114 can send an indication of this changed storage address to the data replication manager 118, which can update the honeypot file address 144. Further tracking operations in the tracking stage 204 will be performed with respect to the updated honeypot file address 144.

By using the data protection system according to some implementations of the present disclosure, early detection of a potential attack against data can be performed. In some cases, early detection of the attack against data can occur even before encryption of data or theft of data occurs. For example, any access of a honeypot file can disable a protected VM or the computer system 102 to prevent any further actions, which can prevent any further encryption of data or retrieval of data. Disabling a protected VM can refer to shutting down the VM or disconnecting the VM from a network. In examples where the attack detection relies on use of the data replication manager 118 to detect accesses of data at the honeypot file address 144, the attack detection can be accomplished without having to invest in substantial additional resources for protecting against attacks in systems in which the data replication manager 118 is already implemented. In such systems, the data replication manager 118 can simply be configured to add the potential attack detector 150, and honeypot agents (e.g., 126) can be added to support the creation of honeypot files. As noted above, in other examples, instead of using the data replication manager 118, another program (a data manager which does not replicate data writes) can be employed that performs the tasks 206, 214, 218, 220, 222, 224, 230, 232, and 234 in FIG. 2.

Figure 3:
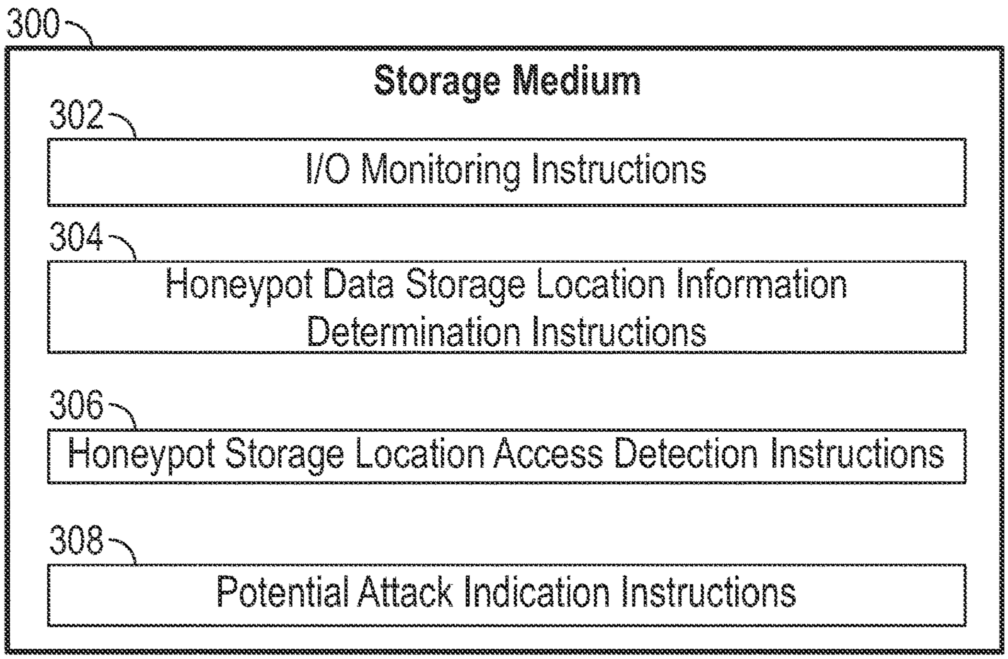
FIG. 3 is a block diagram of a storage medium storing machine-readable instructions according to some examples.

FIG. 3 is a block diagram of a non-transitory machine-readable or computer-readable storage medium 300 storing machine-readable instructions that upon execution cause a system to perform various tasks. The system can include one or more computers. An example of the system is the computer system 102 of FIG. 1.

The machine-readable instructions include I/O monitoring instructions 302 to monitor I/O operations to identify data matching a honeypot pattern. The monitored I/O operations may include the block I/O operations 116 of FIG. 1. The monitoring of I/O operations may be performed by the data replication manager 118, for example, or another data manager. For example, the data replication manager 118 may have stored the honeypot pattern 142 in the memory 140, and the data replication manager 118 can compare data of one or more I/O operations to determine whether the data has a pattern that matches the honeypot pattern 142.

The machine-readable instructions include honeypot data storage location information determination instructions 304 to determine storage location information associated with the data identified as matching the honeypot pattern. The storage location information may include the honeypot file address 144, for example.

The machine-readable instructions include honeypot storage location access detection instructions 306 to detect an access of the data at a storage location indicated by the storage location information. For example, the honeypot storage location access detection instructions 306 can determine whether an I/O operation accesses data at the honeypot file address 144. The detected access includes a read access or a write access.

The machine-readable instructions include potential attack indication instructions 308 to indicate a potential attack based on detecting the access of the data at the storage location indicated by the storage location information. The potential attack indication instructions 308 can send the potential attack notification 152, for example.

In some examples, the data replication manager 118 may receive the honeypot pattern from an agent, such as the honeypot agent 126 of FIG. 1. The agent may create a honeypot file containing the data having the honeypot pattern.

In some examples, the data replication manager identifies one or more data volumes to be protected by the data replication manager by replicating data writes of the one or more data volumes to a replication data repository. The honeypot file created by the agent is in a data volume of the one or more data volumes.

In some examples, the data writes replicated by the data replication manager include data writes performed by a virtual computing entity (e.g., a VM or a container) that is protected by the data replication manager.

In some examples, the agent is executed in the virtual computing entity.

In some examples, the honeypot pattern includes a random pattern or a specified data pattern.

In some examples, the indicating of the potential attack includes providing information identifying a latest recovery point for data. In further examples, the indicating of the potential attack includes providing write data written to the storage location indicated by the storage location information.

In some examples, the machine-readable instructions can detect a change of the storage location of the data matching the honeypot pattern, based on detecting the change of the storage location, determine whether an access of the data matching the honeypot pattern at the changed storage location has occurred; and indicate a potential attack based on detecting the access of the data at the changed storage location.

In some examples, the monitoring of the I/O operations and the determining of the storage location information are performed during an initialization stage of a data protection process, and the detecting of the access and the indicating of the potential attack are performed during a tracking stage of the data protection process after the initialization stage.

Figure 4:
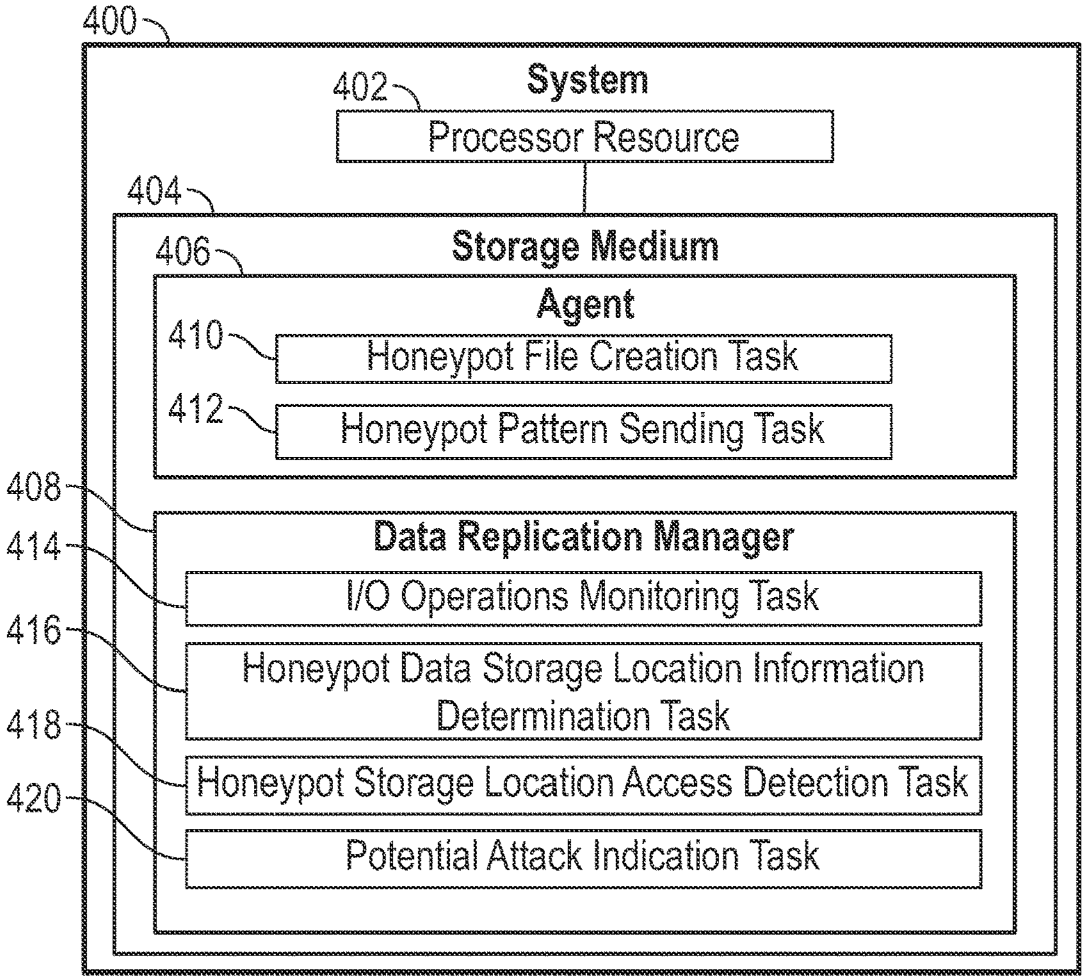
FIG. 4 is a block diagram of a system according to some examples.

FIG. 4 is a block diagram of a system 400, which can be implemented using one or more computers. The system 400 includes a processor resource 402, which includes one or more hardware processors. A hardware processor can include a microprocessor, a core of a multi-core microprocessor, a microcontroller, a programmable integrated circuit, a programmable gate array, or another hardware processing circuit.

The system 400 includes a storage medium 404 storing machine-readable instructions of an agent 406 (e.g., the honeypot agent 126 of FIG. 1) and a data replication manager 408 (e.g., 118 in FIG. 1). The agent 406 is executable on the processor resource 402 to perform tasks 410 and 412, and the data replication manager 408 is executable on the processor resource 402 to perform tasks 414, 416, 418, and 420. In examples where the processor resource 402 includes multiple hardware processors, the agent 406 and the data replication manager 408 may be executable on different hardware processors or on the same hardware processors.

The task 410 of the agent 406 is a honeypot file creation task to create a honeypot file. In some examples, the created honeypot file is added to a data volume to be protected by the data replication manager 408.

The task 412 of the agent 406 is a honeypot pattern sending task to send, to the data replication manager 408, a honeypot pattern, such as the honeypot pattern 142 of FIG. 1.

The task 414 of the data replication manager 408 is an I/O operations monitoring task to monitor I/O operations to identify data matching the honeypot pattern. The monitored I/O operations can include the block I/O operations 116 of FIG. 1.

The task 416 of the data replication manager 408 is a honeypot data storage location information determination task to determine storage location information associated with the data identified as matching the honeypot pattern. The storage location information identifies a storage location of the honeypot file. For example, the storage location information includes the honeypot file address 144 of FIG. 1.

The task 418 of the data replication manager 408 includes honeypot storage location access detection task to detect an access of the data at the storage location of the honeypot file. The task 420 of the data replication manager 408 is a potential attack indication task to indicate a potential attack based on detecting the access of the data at the storage location of the honeypot file.

In some examples, the agent 406 is part of a virtual computing entity such as a VM or a container. The system 400 further includes a driver (e.g., the driver 114 of FIG. 1) to generate block I/O operations corresponding to data transactions of the virtual computing entity. The I/O operations monitored by the data replication manager include the block I/O operations.

Figure 5:
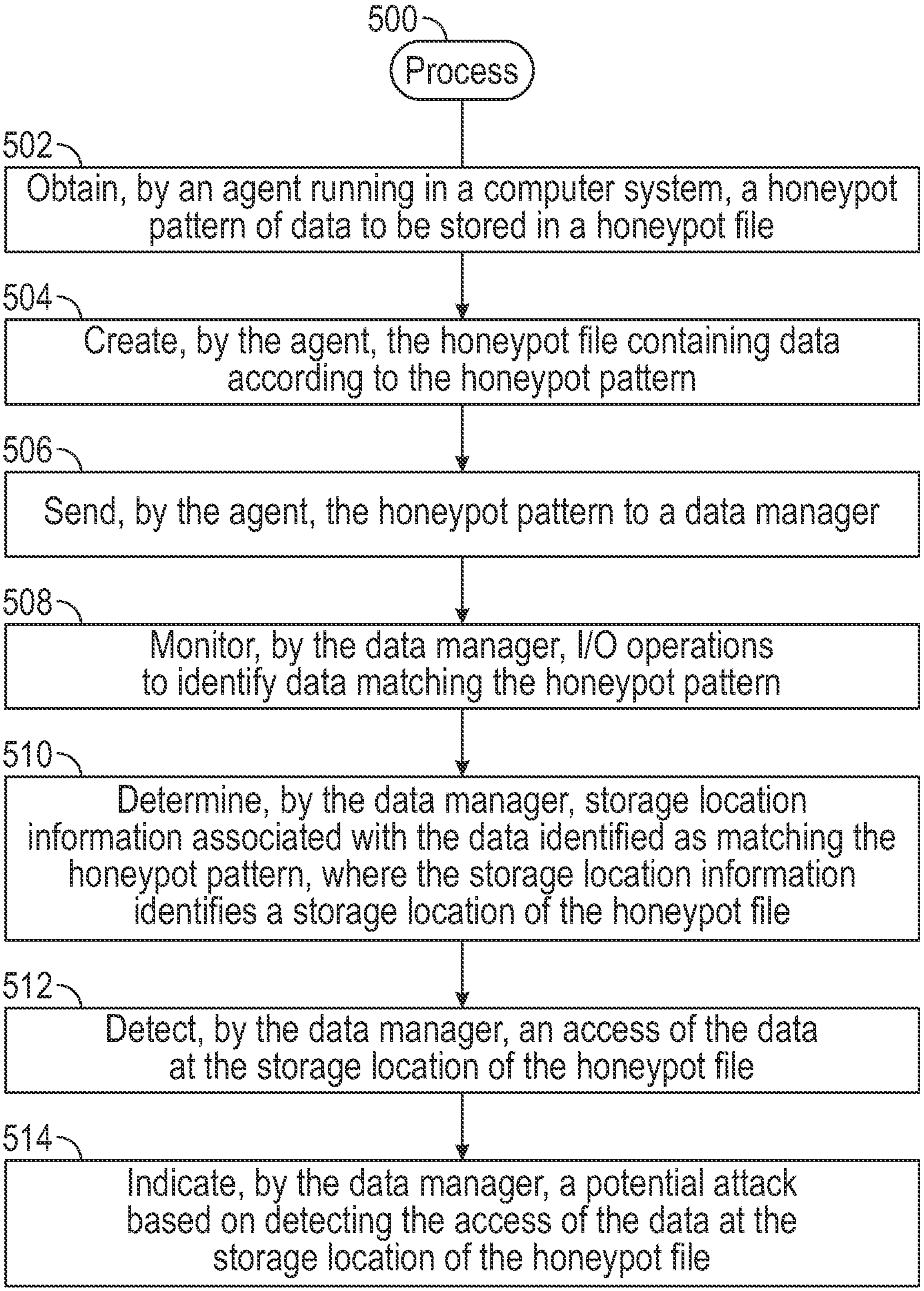
FIG. 5 is a flow diagram of a process according to some examples.

FIG. 5 is a flow diagram of a process 500 according to some examples. The process 500 can be performed in the computer system 102, for example.

The process 500 includes obtaining (at 502), by an agent running in a computer system, a honeypot pattern of data to be stored in a honeypot file. The agent can be the honeypot agent 126 of FIG. 1, for example. The agent can obtain the honeypot pattern by creating the honeypot pattern or receiving the honeypot pattern from another entity.

The process 500 includes creating (at 504), by the agent, the honeypot file. The created honeypot file contains data according to the honeypot pattern can be added to a data volume to be protected by a data replication manager.

The process 500 includes sending (506), by the agent, the honeypot pattern to a data manager. The data manager can store the honeypot pattern in a memory. In some examples, the data manager is the data replication manager 118 of FIG. 1.

The process 500 includes monitoring (at 508), by the data manager, I/O operations to identify data matching the honeypot pattern. The data matching the honeypot pattern may be the subject of a single I/O operation or the subject of multiple I/O operations.

The process 500 includes determining (at 510), by the data manager, storage location information associated with the data identified as matching the honeypot pattern, where the storage location information identifies a storage location of the honeypot file. The storage location information can include a storage address of the honeypot file.

The process 500 includes detecting (at 512), by the data manager, an access of the data at the storage location of the honeypot file. The access of the data at the storage location of the honeypot file can be performed in one or more I/O operations intercepted by the data manager.

The process 500 includes indicating (at 514), by the data manager, a potential attack based on detecting the access of the data at the storage location of the honeypot file.

A storage medium (e.g., 300 in FIG. 3 or 404 in FIG. 4) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a system to:

receive, by a data replication manager from an agent, a honeypot pattern to be contained in a honeypot file created by the agent, the data replication manager to replicate data writes to a replication data repository;

monitor, by the data replication manager, input/output (I/O) operations to identify data of one or more I/O operations matching the honeypot pattern, the I/O operations being part of a write of the honeypot file containing the honeypot pattern by the agent to a storage system, wherein the honeypot pattern is contained within a collection of data blocks of multiple I/O operations that are part of the I/O operations monitored by the data replication manager;

based on identifying the data in the collection of data blocks of the multiple I/O operations matching the honeypot pattern, determine, by the data replication manager, storage location information associated with the data identified as matching the honeypot pattern;

detect, by the data replication manager, an access of the data at a storage location indicated by the storage location information; and indicate, by the data replication manager, a potential attack based on detecting the access of the data at the storage location indicated by the storage location information.

2. A non-transitory machine-readable storage medium comprising instructions that upon execution cause a system to:

create, by an agent, a honeypot pattern;

write, by the agent, a honeypot file containing the honeypot pattern to a storage, wherein the honeypot pattern created by the agent comprises a random honeypot pattern generated using a random number generator;

receive, by a data replication manager from the agent, the honeypot pattern to be contained in the honeypot file created by the agent, the data replication manager to replicate data writes to a replication data repository;

monitor, by the data replication manager, input/output (I/O) operations to identify data of one or more I/O operations matching the honeypot pattern, the I/O operations being part of a write of the honeypot file containing the honeypot pattern by the agent to a storage system;

based on identifying the data of the one or more I/O operations matching the honeypot pattern, determine, by the data replication manager, storage location information associated with the data identified as matching the honeypot pattern;

detect, by the data replication manager, an access of the data at a storage location indicated by the storage location information; and indicate, by the data replication manager, a potential attack based on detecting the access of the data at the storage location indicated by the storage location information.

3. The non-transitory machine-readable storage medium of claim 1, wherein the instructions upon execution cause the system to:

identify, by the data replication manager, a data volume to be protected by the data replication manager by replicating data writes of the data volume to the replication data repository;

send information of the data volume from the data replication manager to the agent; and in response to receiving the information of the data volume from the data replication manager, write, by the agent, the honeypot file containing the honeypot pattern to the data volume in the storage system.

4. The non-transitory machine-readable storage medium of claim 1, wherein the data writes replicated by the data replication manager comprise data writes performed by a virtual computing entity that is protected by the data replication manager.

5. The non-transitory machine-readable storage medium of claim 4, wherein the agent is executed in the virtual computing entity.

6. The non-transitory machine-readable storage medium of claim 1, wherein the indicating of the potential attack comprises providing a notification of the potential attack and information identifying a latest recovery point for data.

7. The non-transitory machine-readable storage medium of claim 1, wherein the indicating of the potential attack comprises providing a notification of the potential attack and write data written to the storage location indicated by the storage location information.

8. The non-transitory machine-readable storage medium of claim 1, wherein the instructions upon execution cause the system to:
- detect a change of the storage location of the data matching the honeypot pattern;
- based on detecting the change of the storage location, determine whether an access of the data matching the honeypot pattern at the changed storage location has occurred; and
- indicate a potential attack based on detecting the access of the data at the changed storage location.

9. The non-transitory machine-readable storage medium of claim 1, wherein the detected access comprises a read access or a write access.

10. The non-transitory machine-readable storage medium of claim 1, wherein the monitoring of the I/O operations and the determining of the storage location information are performed during an initialization stage of a data protection process, and
- wherein the detecting of the access and the indicating of the potential attack are performed during a tracking stage of the data protection process after the initialization stage.

11. A system comprising:
- a processor resource;
- a non-transitory storage medium storing machine-readable instructions of an agent and a data replication manager,
- the agent executable on the processor resource to:
  - create a honeypot file,
  - send, to the data replication manager, a honeypot pattern, and
  - write the honeypot file containing the honeypot pattern to a protected data volume,
  - wherein the honeypot pattern comprises a random pattern created by the agent using a random number generator,
- the data replication manager executable on the processor resource to:
  - monitor input/output (I/O) operations to identify data of one or more I/O operations matching the honeypot pattern, the I/O operations being part of the write of the honeypot file by the agent to the protected data volume;
  - based on identifying the data of the one or more I/O operations matching the honeypot pattern, determine storage location information associated with the data identified as matching the honeypot pattern, wherein the storage location information identifies a storage location of the honeypot file;
  - detect an access of the data at the storage location of the honeypot file; and
  - indicate a potential attack based on detecting the access of the data at the storage location of the honeypot file.

12. The system of claim 11, wherein the data replication manager is executable on the processor resource to:
- identify the protected data volume to be protected by the data replication manager by replicating data writes of the protected data volume to a replication data repository; and
- send, from the data replication manager, information of the protected data volume to the agent.

13. The system of claim 11, wherein the storage location information comprises a storage address of the honeypot file.

14. The system of claim 11, wherein the agent is part of a virtual computing entity, and the system further comprises:
- a driver to generate block I/O operations corresponding to data transactions of the virtual computing entity,
- wherein the one or more I/O operations containing the data matching the honeypot pattern monitored by the data replication manager comprise one or more block I/O operations.

15. A method comprising:
- obtaining, by an agent running in a computer system, a honeypot pattern of data to be stored in a honeypot file, wherein the honeypot pattern is generated by the agent using a random number generator;
- creating, by the agent, the honeypot file containing data according to the honeypot pattern;
- sending, by the agent, the honeypot pattern to a replication data manager;
- writing, by the agent, the honeypot file containing the data according to the honeypot pattern to a storage system;
- monitoring, by the replication data manager, input/output (I/O) operations to identify data of one or more I/O operations matching the honeypot pattern, the I/O operations being part of the write of the honeypot file by the agent to the storage system, and the data replication manager to replicate data writes to a replication data repository;
- based on identifying the data of the one or more I/O operations matching the honeypot pattern, determining, by the replication data manager, storage location information associated with the data identified as matching the honeypot pattern, wherein the storage location information identifies a storage location of the honeypot file;
- detecting, by the replication data manager, an access of the data at the storage location of the honeypot file; and
- indicating, by the replication data manager, a potential attack based on detecting the access of the data at the storage location of the honeypot file.

16. The method of claim 15, further comprising:
- identifying, by the data replication manager, one or more data volumes to be protected by the data replication manager by replicating data writes of the one or more data volumes to the replication data repository, wherein the honeypot file created by the agent is in a data volume of the one or more data volumes, wherein the data writes replicated by the data replication manager comprises data writes performed by a virtual computing entity that is protected by the data replication manager, and wherein the agent is executed in the virtual computing entity.

* * * * *